US012200559B2

(12) United States Patent
Jung et al.

(10) Patent No.: US 12,200,559 B2
(45) Date of Patent: *Jan. 14, 2025

(54) CELLULAR NETWORK AREA OPTIMIZER

(71) Applicant: AT&T Intellectual Property I, L.P., Atlanta, GA (US)

(72) Inventors: Gueyoung Jung, Belle Mead, NJ (US); Edward Daniels, Wadsworth, OH (US); Matti Hiltunen, Morristown, NJ (US); Rittwik Jana, Montville, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 147 days.

This patent is subject to a terminal disclaimer.

(21) Appl. No.: 18/177,841

(22) Filed: Mar. 3, 2023

(65) Prior Publication Data
US 2023/0209429 A1    Jun. 29, 2023

Related U.S. Application Data

(63) Continuation of application No. 17/396,945, filed on Aug. 9, 2021, now Pat. No. 11,622,310.

(51) Int. Cl.
*H04W 36/22* (2009.01)
*H04W 16/18* (2009.01)
(Continued)

(52) U.S. Cl.
CPC ............ *H04W 36/22* (2013.01); *H04W 16/18* (2013.01); *H04W 16/22* (2013.01); *H04W 24/02* (2013.01);
(Continued)

(58) Field of Classification Search
CPC ............. H04W 36/22; H04W 28/0983; H04W 28/0942; H04W 16/18; H04W 16/22; H04W 24/02; H04W 36/245
See application file for complete search history.

(56) References Cited

U.S. PATENT DOCUMENTS 8,089,939 B1 *  1/2012  Mater ............... H04W 36/30
                                                    370/332
8,494,989 B1 *  7/2013  VanDerHorn ....... H04W 24/02
                                                    706/13
(Continued)

FOREIGN PATENT DOCUMENTS

WO    WO-2012091641 A1 *  7/2012  ............ H04W 24/00
WO    WO-2019185143 A1 * 10/2019  ............ H04W 16/18
(Continued)

OTHER PUBLICATIONS

U.S. Appl. No. 17/396,945, filed Aug. 9, 2021.
(Continued)

Primary Examiner — Mehmood B. Khan
(74) Attorney, Agent, or Firm — Guntin & Gust, PLC; Dana B. LeMoine

(57) ABSTRACT

The described technology is generally directed towards a cellular network area optimizer. The area optimizer observes cellular network conditions at multiple radio access network (RAN) nodes within a target area. Based on observed conditions, the area optimizer applies a set of parameter values at the multiple RAN nodes. The set of parameter values enhances the overall throughput, while maintaining or improving connection retainability and accessibility, of the multiple RAN nodes under the observed conditions. The area optimizer learns different sets of parameter values to apply in response to different observed conditions by making parameter value adjustments and observing the effect of the adjustments on overall throughput of the RAN nodes in the target area.

20 Claims, 11 Drawing Sheets

(51) Int. Cl.
*H04W 16/22* (2009.01)
*H04W 24/02* (2009.01)
*H04W 28/08* (2023.01)
*H04W 36/00* (2009.01)
*H04W 36/24* (2009.01)

(52) U.S. Cl.
CPC ... *H04W 28/0942* (2020.05); *H04W 28/0983* (2020.05); *H04W 36/008375* (2023.05)

(56) References Cited

U.S. PATENT DOCUMENTS

| | | | |
|---|---|---|---|
| 10,477,426 B1* | 11/2019 | Tiwari | H04L 43/0852 |
| 11,032,735 B2 | 6/2021 | Stawiarski et al. | |
| 2010/0159991 A1* | 6/2010 | Fu | H04W 24/02 455/466 |
| 2013/0040683 A1* | 2/2013 | Siomina | H04W 24/08 455/517 |
| 2013/0051226 A1* | 2/2013 | Elefant | H04W 28/0289 370/230 |
| 2014/0031044 A1* | 1/2014 | Mazzarella | H04W 36/245 455/440 |
| 2014/0031049 A1* | 1/2014 | Sundaresan | H04W 24/02 455/446 |
| 2019/0141619 A1* | 5/2019 | Dudzinski | H04W 76/10 |
| 2020/0412484 A1* | 12/2020 | Jonsson | H04B 7/06 |
| 2021/0037394 A1* | 2/2021 | Wainer | G06N 5/003 |
| 2021/0219182 A1* | 7/2021 | Yuan | H04W 72/00 |
| 2021/0314790 A1* | 10/2021 | Veijalainen | H04L 43/022 |
| 2022/0159347 A1* | 5/2022 | Froehlich | H04N 21/6131 |
| 2022/0295343 A1* | 9/2022 | Pefkianakis | H04W 24/08 |
| 2022/0369215 A1* | 11/2022 | Dees | H04B 7/2606 |

FOREIGN PATENT DOCUMENTS

| | | | | |
|---|---|---|---|---|
| WO | WO-2022038292 A1 * | 2/2022 | | H04W 48/18 |
| WO | WO-2022098713 A1 * | 5/2022 | | H04L 43/028 |

OTHER PUBLICATIONS

U.S. Appl. No. 16/890,631, filed Jun. 2, 2020.
Notice of Allowance received for U.S. Appl. No. 17/396,945 dated Dec. 5, 2022, 36 pages.

* cited by examiner

CELLULAR NETWORK AREA OPTIMIZER

RELATED APPLICATION

The subject patent application is a continuation of, and claims priority to, U.S. patent application Ser. No. 17/396,945, filed Aug. 9, 2021, and entitled "CELLULAR NETWORK AREA OPTIMIZER," the entirety of which priority application is hereby incorporated by reference herein.

TECHNICAL FIELD

The subject application is related to cellular communication systems, e.g., to radio access network (RAN) load balancing for improved throughput, without decreasing connection retainability or accessibility, of cellular network traffic in fourth generation (4G), fifth generation (5G), and subsequent generation cellular networks.

BACKGROUND

Radio access network (RAN) load balancing can be used to improve cellular communication service. For example, when mobile device users are within range of a more loaded cell as well as a less loaded cell, load balancing can be applied to divert some of the users/mobile devices to the less loaded cell, resulting in improved service for all of the affected users/mobile devices.

Load balancing can be complicated by numerous factors. For example, rather than waiting for cells to become overloaded, load balancing can be advantageously applied proactively by attempting to predict future network conditions. Furthermore, load balancing can potentially involve more than two neighbor cells, and the distance between the cells, geography between the cells, cell configurations, and numerous other factors can be unique to a particular area. These and other factors make load balancing a complex problem, and there is a need for improved solutions.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
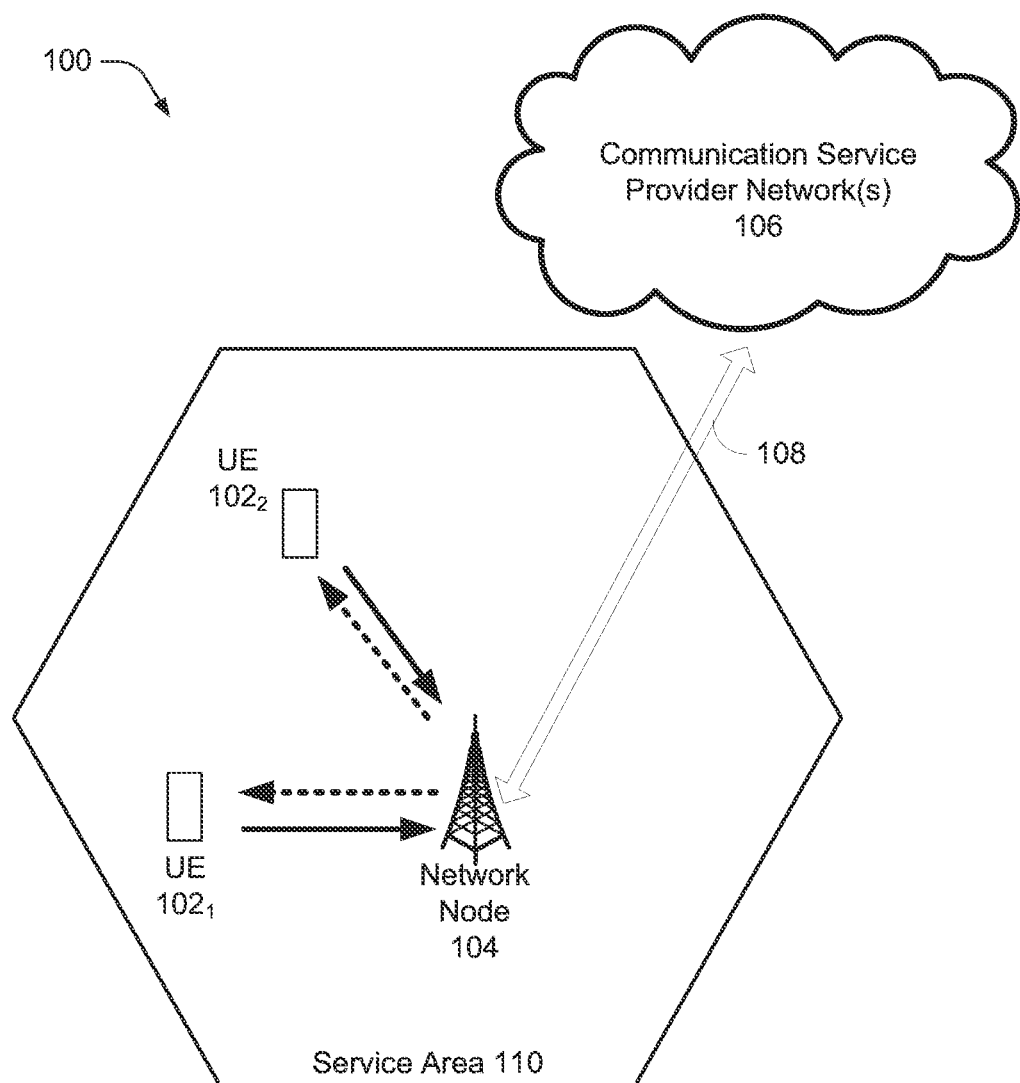
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards a cellular network area optimizer. In some examples, the area optimizer can comprise a component of a radio access network (RAN) network controller configured for fast closed loop control of network nodes in a target network area. The area optimizer can be adapted to observe cellular network conditions at multiple RAN nodes within a target area. Based on observed conditions, the area optimizer can apply a set of parameter values at the multiple RAN nodes. The set of parameter values can enhance the overall throughput without decreasing connection retainability or accessibility, of the multiple RAN nodes under the observed conditions.

The area optimizer can explore and learn different sets of parameter values to apply in response to different observed conditions. To learn a set of parameter values, the area optimizer can make incremental parameter value adjustments in response to an observed condition, and the area optimizer can observe the effect of the adjustments within the target area, to thereby identify a set of parameter values which increases overall throughput, without decreasing connection retainability or accessibility, of the RAN nodes in the target area when applied in response to the observed condition. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other 4G systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represents uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
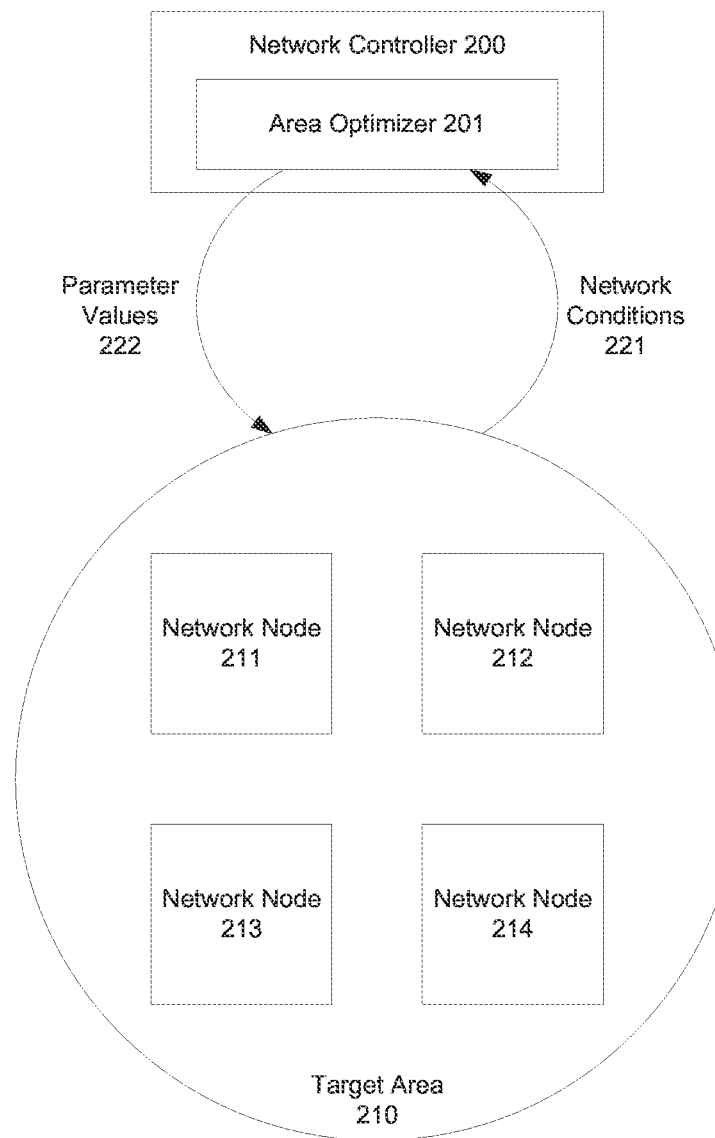
FIG. 2 illustrates an example cycle in which an area optimizer receives network conditions from a target area and provides parameter values to the target area, in accordance with various aspects and embodiments of the subject disclosure.

FIG. 2 illustrates an example cycle in which an area optimizer receives network conditions from a target area and provides parameter values to the target area, in accordance with various aspects and embodiments of the subject disclosure. FIG. 2 includes a network controller 200 comprising an area optimizer 201 configured to provide fast closed loop control of network nodes. FIG. 2 also includes a target area 210 comprising multiple example RAN nodes, e.g., network nodes 211, 212, 213, and 214. Network conditions 221 are provided from the target area 210 to the area optimizer 201, and parameter values 222 are provided from the area optimizer 201 to the target area 210.

In FIG. 2, the network controller 200 can include, e.g., a near real-time RAN intelligent controller (nRIC) in a core network such as communication service provider network(s) 106 illustrated in FIG. 1. The network controller 200 can be dedicated to a particular target area 210, or can serve multiple target areas. However, the area optimizer 201 can be dedicated to target area 210 for which area optimizer 201 provides fast closed loop control. The network controller 200 can optionally include additional area optimizers to serve other target areas.

The target area 210 can comprise, e.g., a contiguous geographical area comprising multiple network nodes 211, 212, 213, and 214. The network nodes 211, 212, 213, and 214 can implement, e.g. the network node 104 introduced in FIG. 1. Each of the network nodes 211, 212, 213, and 214 can have a service area such as service area 110, and the service areas of network nodes 211, 212, 213, and 214 can be at least partially within the target area 210.

Neighbor relationships can exist between some of the network nodes 211, 212, 213, and 214 in the target area 210, e.g., some cells of network node 211 can be a neighbor of one or more of cells of network nodes 212, 213, and 214. However, neighbor relationships need not exist between all of the network nodes 211, 212, 213, and 214 in the target area 210. For example, network node 211 is not necessarily a neighbor of network node 214.

Each of the network nodes 211, 212, 213, and 214 can measure and report information included in network conditions 221. Example information which can be included in network conditions 221 comprises, but is not limited to a physical resource block (PRB) utilization measurements, control channel element (CCE) utilization measurements, a number of concurrent radio resource control (RRC) sessions, an average user equipment throughput, reference signal receive power (RSRP) distribution information, and/or reference signal receive quality (RSRQ) distribution information.

Each of the network nodes 211, 212, 213, and 214 can be configured to operate according to multiple adjustable parameters. Network node parameters can be adjusted by the parameter values 222 supplied by the area optimizer 201.

Parameter values 222 can include different parameter values for different network nodes 211, 212, 213, and 214. Example parameters which can be set according to parameter values 222 comprise, but are not limited to, idle mode load balancing parameters, connected mode load balancing parameters, dual connection parameters, mobility coverage parameters, and/or carrier aggregation (CA) parameters.

The supply of network conditions 221 to area optimizer 201 and the provision of parameter values 222 to network nodes 211, 212, 213, and 214 can operate in a loop performed at short periodic time intervals, while exploring and learning the target area 210. For example, at a first time T1, first network conditions 221 can be provided to area optimizer 201, and area optimizer 201 can determine and provide a first set of parameter values 222 to network nodes 211, 212, 213, and 214. After elapse of a time interval, at a second time T2, second network conditions 221 can be provided to area optimizer 201, and area optimizer 201 can determine and provide a second set of parameter values 222 to network nodes 211, 212, 213, and 214. The loop can be repeated at each successive time interval. The time intervals can be any length of time, e.g. 1 second to 15 minute time intervals can be appropriate for some embodiments. The length of time intervals can optionally depend on characteristics of the target area 200 such as whether the target area 200 is urban, sub-urban, or rural. The length of time intervals can furthermore optionally depend on time of day such as busy or idle hours. One embodiment can use 15 minute time intervals. Embodiments that operate in a loop can implement area optimizer 201 as a traffic steering application configured for fast closed loop control of network parameters.

The area optimizer 201 can determine which parameter values 222 to provide to the network nodes 211, 212, 213, and 214 in the target area 210. The parameter values 222 can be designed to incrementally increase, and eventually maximize, the collective throughput of the network nodes 211, 212, 213, and 214 in the target area 210, without decreasing connection retainability and accessibility thereof. In some instances, after an initial exploration and learning stage, the area optimizer 201 can recognize the network conditions 221, and the area optimizer 201 can look up a known set of parameter values 222 which increases target area 210 throughput, without decreasing connection retainability or accessibility, under the recognized conditions.

In some instances, during or after the initial exploration and learning stage, the area optimizer 201 may not recognize the network conditions 221, e.g., unexpected events may occur in target area 200. The area optimizer 201 can store the unrecognized network conditions 221 as newly recognized conditions. During the time interval in which the newly recognized conditions were received, the area optimizer 201 can make parameter adjustments, via parameter values 222, as part of a supplemental exploration and learning stage, and the area optimizer 201 can assess resulting throughput, retainability, and accessibility changes in the target area 210, in order to learn parameter values which increase target area 210 throughput, without decreasing connection retainability and accessibility, under the newly recognized conditions.

In other instances, after the initial exploration and learning stage, the area optimizer 201 can look for parameter values that can improve throughput, without decreasing connection retainability and accessibility, under known network conditions 221. For example, the area optimizer 201 can apply parameter values 222 in order to determine whether parameter values 222 can improve throughput, without decreasing connection retainability and accessibility. Once the area optimizer 201 finds better parameter values 222 for the known network conditions 221, the area optimizer 201 can store the new parameter values 222 for the known network conditions 221. Testing of new parameter values for potential throughput improvement can optionally be activated from time to time. In some cases, an irregular or random time interval can be used to determine a schedule for testing new parameters.

Figure 3A:
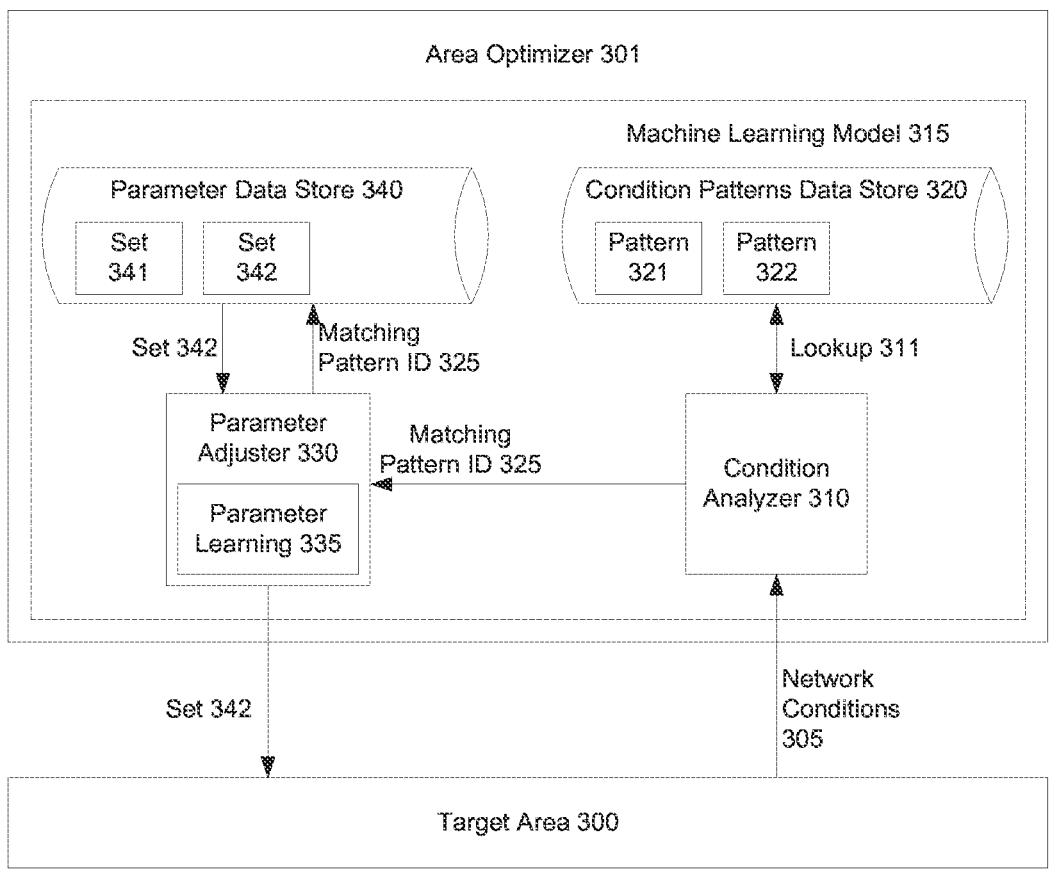
FIG. 3A illustrates an example area optimizer and example operations performed in connection with a proactive response, in which parameter values are applied to network nodes in response to recognized network conditions, in accordance with various aspects and embodiments of the subject disclosure.
Figure 3B:
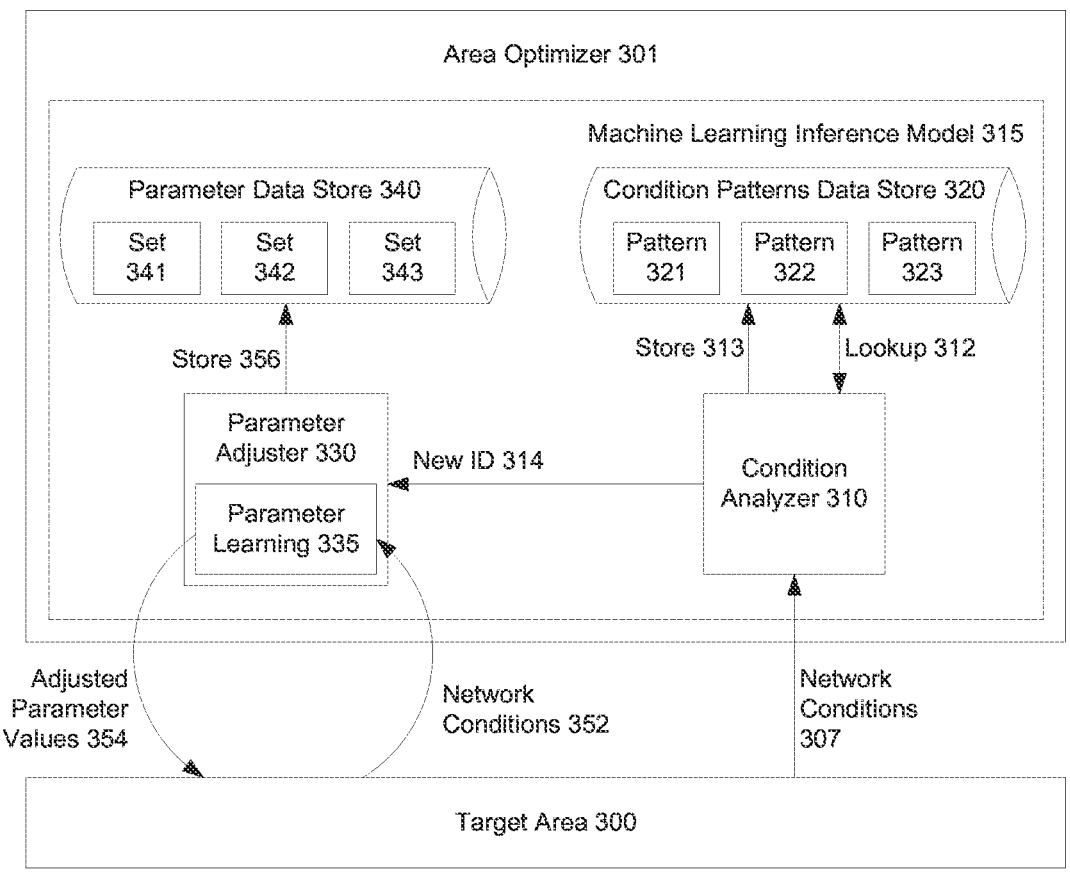
FIG. 3B illustrates the example area optimizer from FIG. 3A, and example operations performed in connection with a reactive response, in which parameter values are explored in response to unrecognized network conditions, in accordance with various aspects and embodiments of the subject disclosure.

FIG. 3A illustrates an example area optimizer and example operations performed in connection with a proactive response, in which parameter values are applied to network nodes in response to recognized network conditions, in accordance with various aspects and embodiments of the subject disclosure. FIG. 3B illustrates the example area optimizer from FIG. 3A, and example operations performed in connection with a reactive response, in which parameter values are explored in response to unrecognized network conditions, in accordance with various aspects and embodiments of the subject disclosure.

In an embodiment, proactive responses such as illustrated in FIG. 3A can be conducted after an initial exploration and learning stage, such as illustrated in FIG. 3B. Furthermore, the exploration and learning stage illustrated in FIG. 3B, can be conducted even after initial exploration and learning, in order to further improve parameters applicable in proactive responses according to FIG. 3A.

In FIG. 3A and FIG. 3B, the example area optimizer 301 can implement the area optimizer 201 introduced in FIG. 2, and the target area 300 can provide a target area comprising network nodes, such as target area 210. Area optimizer 301 comprises condition analyzer 310 and condition patterns data store 320. Area optimizer 301 further comprises parameter adjuster 330 and parameter data store 340, wherein parameter adjuster 330 comprises parameter learning 335.

In FIG. 3A, the condition analyzer 310 receives network conditions 305 from the network nodes of the target area 300, and the condition analyzer 310 performs a lookup 311 to determine whether network conditions 305 substantially match a stored pattern, e.g., pattern 321 or pattern 322, stored in condition patterns data store 320. The condition analyzer 310 finds a matching pattern, thereby recognizing network conditions 305, and the condition analyzer 310 sends a matching pattern identifier (ID) 325 to the parameter adjuster 330. The parameter adjuster 330 can use the matching pattern identifier ID 325 to look up a set of corresponding parameter values in the parameter value data store 340. In the illustrated example, parameter value data store 340 includes set 341 and set 342, wherein each set comprises adjusted parameter values for the network nodes of target area 300. Matching pattern identifier ID 325 is associated with, e.g., set 342, and so parameter adjuster 330 can retrieve set 342 from the parameter value data store 340. Parameter adjuster 330 can provide the set 342 to the target area 300, e.g., by sending different respective parameter values within the set 342 to different respective network nodes within the target area 300.

In FIG. 3B, the condition analyzer 310 receives network conditions 307 from the network nodes of the target area 300, and the condition analyzer 310 performs a lookup 312 to determine whether network conditions 307 substantially match a stored pattern, e.g., pattern 321 or pattern 322, stored in condition patterns data store 320. The condition analyzer 310 does not find a matching pattern, and so network conditions 307 are unrecognized. In response to determining that the network conditions 307 are unrecognized, the condition analyzer 310 can store 313 a new pattern 323 in the condition patterns data store 320, so that future network conditions similar to network conditions 307 can be recognized as matching the new pattern 323.

Determinations regarding whether network conditions 307 substantially match a stored pattern e.g., pattern 321 or pattern 322 can recognize that exact matches of network conditions to stored patterns are unlikely. Therefore, a threshold similarity, such as a 60-100% threshold similarity, can be applied and network conditions 307 can be considered a substantial match to a stored pattern 321 when the threshold similarity is met. The threshold for similarity can be further improved as the area optimizer 301 keeps exploring and learning the target area 300 over time.

In response to determining that the network conditions 307 are unrecognized, condition analyzer 310 can indicate a new ID 314 to the parameter adjuster 330. In response to the new ID 314, the parameter adjuster 330 can activate parameter exploration and learning, e.g., via parameter learning 335. Parameter learning 335 can initiate a loop in which adjusted parameter values 354 are provided to network nodes of target area 300, and resulting network conditions 352 are returned to parameter learning 335. For each loop cycle, parameter learning 335 can (1) evaluate network conditions 352 to determine the effect of the adjusted parameter values 354 on the target area 300, (2) modify the adjusted parameter values 354, and (3) redeploy the modified adjusted parameter values 345.

Parameter learning 335 can use the loop to determine a new set 343 of adjusted parameter values, wherein the new set 343 increases the average throughput, without decreasing retainability and/or accessibility, of the target area 300. Parameter learning 335 can store 356 the new set 343 in the parameter value data store 340, wherein new set 343 is correlated with new ID 314, so that new ID 314 and set 343 become available for future use as described with reference to FIG. 3A.

In some embodiments, parameter learning 335 can determine the new set 343 by incrementally adjusting the adjusted parameter values 354 with each repetition of the cycle, and assessing whether each incremental adjustment results in an increase or a decrease in target area 300 throughput, without decreasing retainability and/or accessibility. An incremental adjustment is defined herein as an adjustment of 20% or less. Incremental adjustments which increase throughput can be followed by further incremental adjustments in a same direction as a previous incremental adjustment. For example, an incremental adjustment of a parameter value from 100 to 102, which increases throughput, can be followed by an incremental adjustment from 102 to 104. Parameter learning 335 can continue to make incremental adjustments until a resulting decrease in throughput is observed. After the decrease in throughput is observed, parameter learning 335 can determine, from the incremental adjustments, a parameter value that resulted in a maximum throughput increase, and parameter learning 335 can include the determined parameter value in the set 343.

Parameter learning 335 include one or more adjusted parameters in adjusted parameter values 354. For example, in some embodiments, parameter learning 335 can include, in adjusted parameter values 354, a single adjusted parameter value for a single network node within the target area 300. In other embodiments, adjusted parameter values 354 can include an adjusted value for a single parameter at multiple network nodes within the target area 300. In further embodiments, adjusted parameter values 354 can include adjusted values for multiple parameters at a single network node within the target area 300. In still further embodiments, adjusted parameter values 354 can include adjusted values for multiple parameters at multiple network nodes within the target area 300. Parameter learning 335 can optionally be configured vary the number of parameters that are adjusted, and the network nodes to which adjusted parameter values are deployed, in different cycles in order to determine the set 343 which most increases the throughput of the target area 300.

After repeatedly learning the target area 300 via processes in FIG. 3A and FIG. 3B, the area optimizer 301 can build a machine learning inference model 315 using condition analyzer 310, condition patterns data store 320, parameter adjuster 330, and parameter data store 340. The machine learning inference model 315 can return optimal parameter values, such as set 342, for any given network condition such as network conditions 305 in FIG. 3A. The machine learning inference model 315 together with condition patterns data store 320 and parameter data store 340 can be used as an initial inference model for other target areas, other than target area 300. Area optimizers in other target areas can continue adjusting and matching in the learning stage as described herein, in order to determine parameter values tailored to particular target areas.

Figure 4:
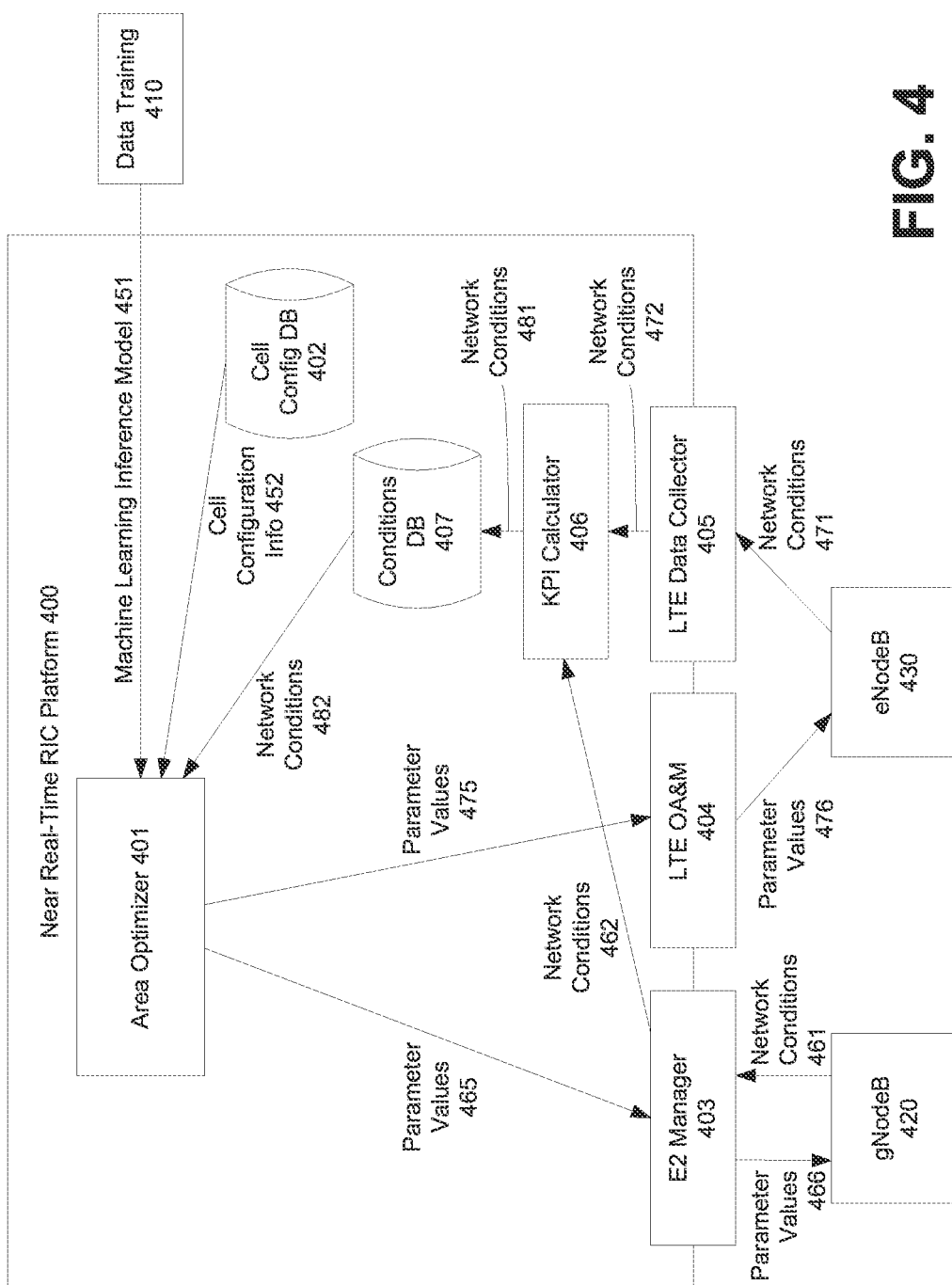
FIG. 4 illustrates an example configuration of network components and example operations the network components in connection with area optimizer operations, in accordance with various aspects and embodiments of the subject disclosure.

FIG. 4 illustrates an example configuration of network components and example operations the network components in connection with area optimizer operations, in accordance with various aspects and embodiments of the subject disclosure. FIG. 4 includes a near real-time RIC platform 400, data training 410, gNodeB 420, and eNodeB 430. The near real-time RIC platform 400 is an example of a fast closed loop network controller 200 introduced in FIG. 2, and comprises area optimizer 401 which can implement, e.g., the area optimizer 201. The near real-time RIC platform 400 comprises cell configuration database 402, E2 manager 403, LTE operations, administration and management (OA&M) 404, LTE data collector 405, key performance indicator (KPI) calculator 406, and conditions database 407.

In example operations according to FIG. 4, data training 410 can provide a machine learning inference model 451 to the area optimizer 401. The machine learning inference model 451 can implement, e.g., a machine learning inference model 315 introduced in FIG. 3A. The cell configuration database 402 can provide cell configuration information 452 to the area optimizer 401. The gNodeB 420 can provide network conditions 461 to the E2 manager 403. The E2 manager 403 can aggregate network conditions 461 with other network conditions data, gathered from other gNodeBs in a target area (not shown in FIG. 4), and provide aggregated network conditions 462 to KPI calculator 406. The eNodeB 430 can provide network conditions 471 to the LTE data collector 405. The LTE data collector 405 can aggregate network conditions 471 with other network conditions data, gathered from other eNodeBs in the target area (not shown in FIG. 4), and provide aggregated network conditions 472 to KPI calculator 406. The KPI calculator 406 can calculate KPIs based on network conditions 462, 472, and provide the KPIs as network conditions 481 to the conditions database 407. Area optimizer 401 can then read network conditions 482 from among the network conditions 481 stored in the conditions database 407.

Area optimizer 401 can determine parameter values, in either a proactive or reactive approach as described in connection with FIG. 3A and FIG. 3B, and the area optimizer 401 can provide parameter values 465, 475 to the E2 manager 403 and the LTE OA&M 404, respectively. The E2 manager 403 can provide parameter values 466 to gNodeB 420, wherein parameter values 466 comprise parameter values from among parameter values 465 which are designated for gNodeB 420. E2 manager 403 can provide other parameter values of parameter values 465 to other gNodeBs. Similarly, the LTE OA&M 404 can provide parameter values 476 to eNodeB 430, wherein parameter values 476 comprise parameter values from among parameter values 475 which are designated for eNodeB 430. LTE OA&M 404 can provide other parameter values of parameter values 475 to other eNodeBs.

In an example, the near real-time RIC platform 400 equipped with area optimizer 401 can provide a fast closed-loop RAN control platform that autonomously explores and learns LTE and NR traffic loads and corresponding UE throughput, retainability, and accessibility patterns by dynamically adjusting various RAN parameters to control UE handovers among cells. The parameters controlled by area optimizer 401 may depend on RAN vendors, but in general, the parameters can include resource capacity headroom, RSRP coverage thresholds for idle and connected mode, and the delay of carrier aggregation.

As the result of exploration, area optimizer 401 can build a ruleset as a machine learning inference model to indicate improved or optimal parameter values to maximize average UE throughput in a target area, while keeping high connection retainability and accessibility, for any observed traffic loads and signal distribution within a short period. Area optimizer 401 can proactively optimize the average UE throughput using the ruleset and also reactively and quickly adjust parameter values if new patterns are found, if an inference is different from observed throughput, retainability, or accessibility, or if any other improved result can be achieved. Then, area optimizer 401 can update its ruleset over time. The ruleset can be built for a specific target area, e.g., an urban area such as downtown New York City can have a very different ruleset from a sub-urban area such as New Jersey suburbs. As the rulesets from different areas mature, they can also optionally be used to build a general inference model based on any reinforcement learning tool.

A goal of area optimizer 401 can be to proactively and reactively maximize the average UE throughput at runtime, while keeping high connection retainability and accessibility by learning traffic patterns and performing trial-and-recording in a ruleset in fast closed-loop. In an embodiment, area optimizer 401 can be implemented as a traffic steering application.

Area optimizer 401 can be configured to consume inputs including traffic loads, signal distribution, and UE throughputs of target cells and UE groups from an underlying RAN periodically. The period can be, e.g., anything from a few seconds to minutes. In some embodiments, the period can depend on traffic conditions and changes. For example, if traffic changes with a large variance during busy hours, area optimizer 401 can shorten the period, and vice-versa.

In the reactive/exploration stage, area optimizer 401 can incrementally adjust RAN parameter values by observing corresponding changes of traffic loads and UE throughputs and recording the results. In the proactive/execution stage, the area optimizer 401 can build a ruleset that indicates improved/optimal parameter values for any given traffic conditions, and then apply the values to adjust RAN parameters. If a traffic condition has not been explored previously, area optimizer 401 can incrementally explore the condition by reactively and incrementally changing parameters (i.e., returning to the exploration stage).

Depending on the size of a target area and the geographical characteristics of target area (e.g., a big city or rural area), the time to converge the rotation between reactive exploration and proactive execution stages and eventually to build a rich ruleset varies. However, a ruleset built for a target area can optionally be used as an initial ruleset for other target areas, allowing quicker build of the ruleset for a target area.

In an embodiment, area optimizer 401 can deal with some core parameters for both resource capacity parameters and signal-based coverage parameters and their tradeoffs to control idle and connected-mode UE handovers, while considering high retainability and accessibility in a cost-efficient way. By not only reactively exploring but also proactively adjusting such parameters in a fast closed-loop for specific target areas, area optimizer 401 can quickly build the rulesets, and those rulesets can become rich in a cost-efficient way as well. Such collected rulesets can also be used to build a general model that can be applied to other target areas.

In an embodiment, the overall UE throughput in a target area can be improved by: deploying area optimizer 401 into the near-real-time RIC platform 400; exploring and learning, by area optimizer 401, traffic patterns of target area; and balancing loads among cells in the target area, by area optimizer 401, in a manner that improves throughput. The area optimizer 401 can also account for a number of handovers caused by load balancing as well as retainability and accessibility impacts.

Example cell configuration information in the cell configuration database 402 can include, e.g., for each cell in a target area: cell ID; base-station ID; sector (face) in base-station; geolocation as (latitude, longitude, altitude); channel (frequency); bandwidth; band type; neighboring cells: candidate cells to handover UEs; and default RAN parameter values.

Example network conditions information that can be stored in the network conditions database 407 can include, e.g., for each time of day, base-station ID; cell ID; quality of service class identifier (QCI) and allocation and retention priority (ARP): connection status; PRB utilization; CCE utilization; number of concurrent RRC sessions; average UE throughput; RSRP (can be distributed into 5 bins including very bad, bad, medium, good, very good); RSRQ (can be distributed into 5 bins including very bad, bad, medium, good, very good); number of handovers; and retainability and accessibility of data and voice over LTE (VOLTE).

Example parameters adjusted by parameter values 465, 475 can include, e.g., parameters for idle-mode load balancing in each sector, such as load balancing weight percentages; parameters for connected-mode load balancing in inter-frequencies, such as resource capacity percentages, RSRP coverage of target frequencies, on/off states of load balancing UE handovers, and timer durations that set wait times prior to triggering events; parameters for LTE-NR Dual connection, such as weights per UE group defined by QCI and ARP; parameters for mobility coverage in intra and inter-frequencies, such as various thresholds, connected mode coverage, and idle-mode inter-frequency coverage; and parameters for carrier aggregation, such as buffer size thresholds.

In an example, area optimizer 401 can initialize cell information and parameter values from cell configuration database 402, and then proceed with fast closed-loop control in near-real-time. For fast closed-loop control, at the beginning of each time window, area optimizer 401 can collect, from conditions database 407, traffic load condition and average UE throughput of each base-station/sector/cell. Area optimizer 401 can then compute parameter values 465, 475. During an exploration/learning stage, area optimizer 401 can check the traffic load, signal distribution, and throughput changes from prior time windows and then, gradually increase or decrease parameter values (depending on the parameter). During an execution stage: given network conditions (traffic load changes, signal distribution, etc.), the area optimizer 401 can select the parameter values 465, 475 that maximize throughput while keeping retainability and accessibility. Finally, area optimizer 401 can apply the parameter values 465, 475.

Figure 5:
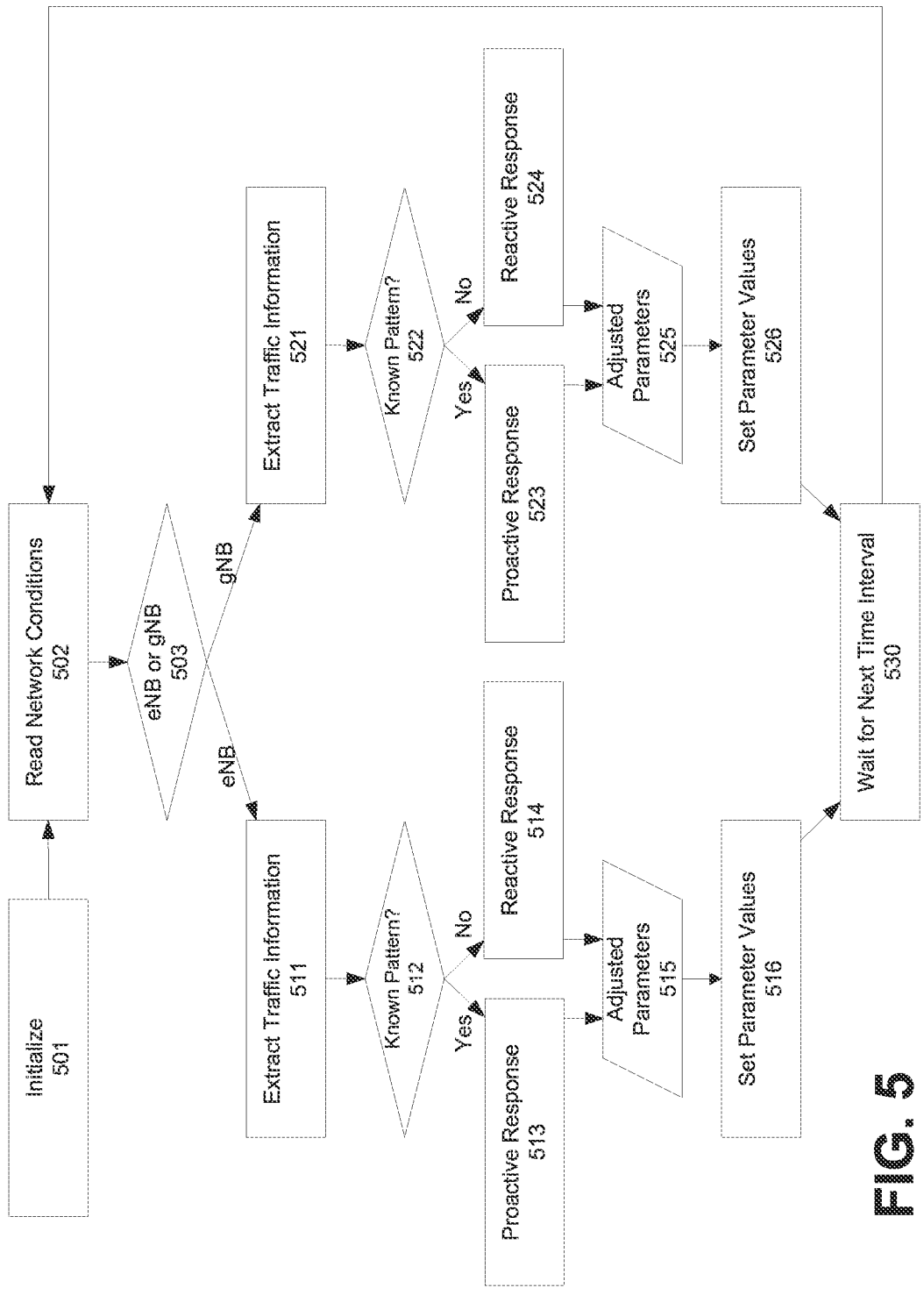
FIG. 5 is a flow diagram representing area optimizer operations with respect to fourth generation (4G) and fifth generation (5G) RAN nodes, in accordance with various aspects and embodiments of the subject disclosure.

FIG. 5 is a flow diagram representing area optimizer operations with respect to fourth generation (4G) and fifth generation (5G) RAN nodes, in accordance with various aspects and embodiments of the subject disclosure. The operations of FIG. 5 can be performed by any of the area optimizer implementations disclosed herein. The operations include initialize 501, read network conditions 502, and eNodeB (eNB) or gNodeB (gNB) 503. At eNB or a gNB 503, the operation can determine whether network conditions 502 pertain to an eNB or a gNB. For eNB, the operations include extract traffic information 511, checking if traffic information comprises a known pattern 512, proactive response 513, reactive response 514, adjusted parameters 515, and set parameter values 516, followed by wait for next time interval 530. For gNB, the operations include extract traffic information 521, checking if traffic information comprises a known pattern 522, proactive response 523, reactive response 524, adjusted parameters 525, and set parameter values 526, followed by wait for next time interval 530. After wait for next time interval 530, the area optimizer 401 can return to read network conditions 502 in order to perform another cycle.

In an embodiment, initialize 501 can comprise initializing the area optimizer, e.g., area optimizer 401 with an initial set of eNB and gNB cell configuration information 452. Initialize 501 can further include importing a machine learning inference model 451 if such a model 451 is available. Read network conditions 502 can comprise reading KPI information from a conditions database 407.

The area optimizer 401 can be configured to perform the operations illustrated from eNB or gNB 503 through wait for next time interval 530 in parallel, thereby simultaneously adjusting parameters for both eNBs and gNBs in a target area. If there are no gNBs, or conversely, if there are no eNBs, then any unnecessary operations can be omitted.

For eNBs and gNBs in the target area, the area optimizer 401 can extract traffic information at 511 and 521, such as traffic load information as well as corresponding sector, frequency, and cell information. At 512 and 522, if the extracted traffic information matches a known pattern, the area optimizer 401 can proceed to the proactive responses 513 and 523. If the extracted traffic information does not match a known pattern, the area optimizer 401 can proceed to the reactive responses 514 and 524. Otherwise, the reactive responses 514 and 524 can be applied when the proactive responses 513 and 523 lead to unexpected results or when an area optimizer 401 randomly explores to check for potential adjusted parameter value improvements. The proactive responses 513 and 523 can apply, as adjusted parameters 515 and 525, a previously identified set of parameters which improves throughput of the target area, optionally followed by further reactive type parameter testing. The reactive responses 514 and 524 can store the extracted traffic information as a new condition, and begin reactive type parameter testing by adjusting, using adjusted parameters 515 and 525, any default parameter values applied at the eNBs and gNBs of the target area, and subsequently storing those parameter values that are determined to increase collective throughput without decreasing connection retainability and accessibility. Parameter values determined can be stored at set parameter values 516 and 526. At wait for next time interval 530, at the beginning of a next time interval the area optimizer 401 can return to read network conditions 502.

Figure 6:
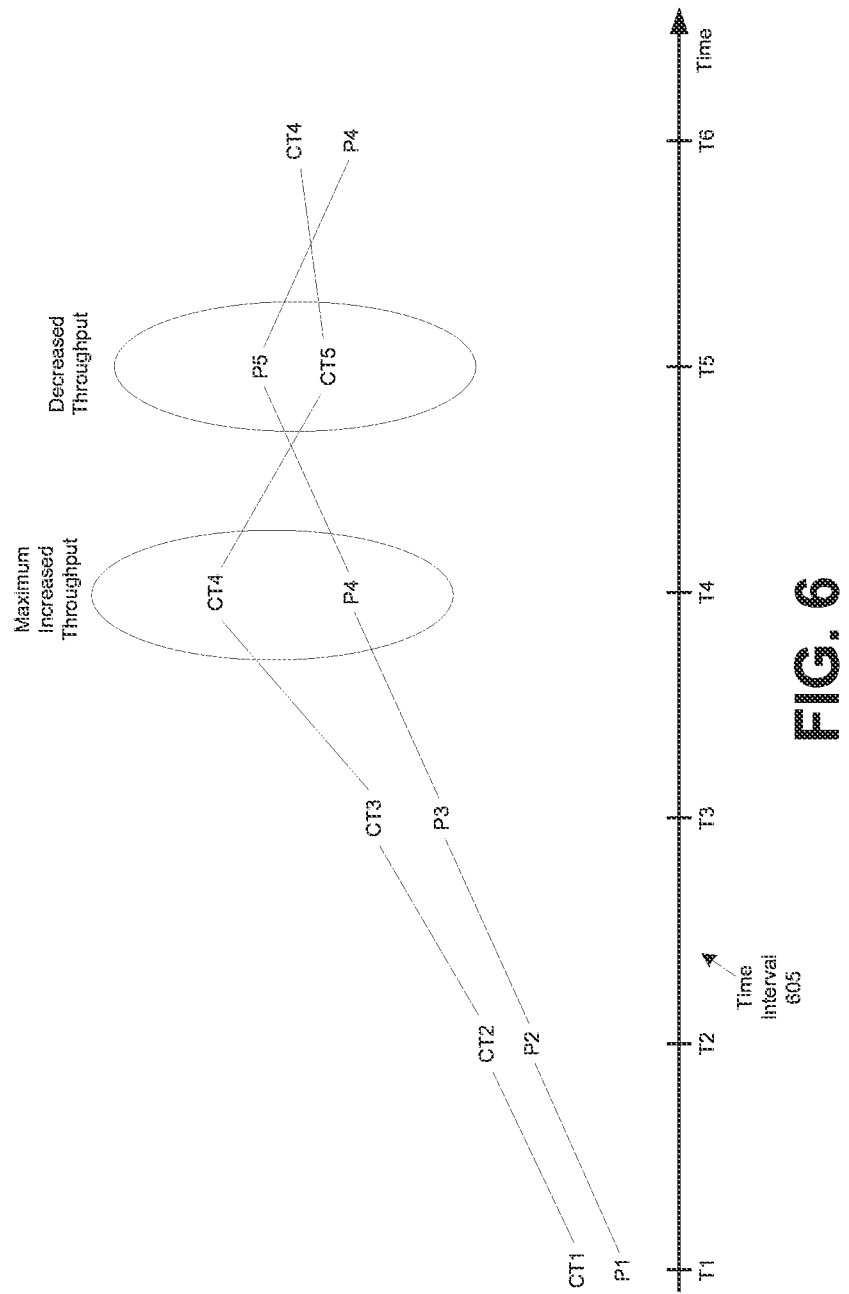
FIG. 6 is a graph illustrating adjustment of parameter values and corresponding collective throughput changes in a target area, in order to learn parameter values to be applied in response to network conditions, in accordance with various aspects and embodiments of the subject disclosure.

FIG. 6 is a graph illustrating adjustment of parameter values and corresponding collective throughput changes in a target area for a single example parameter, in order to learn parameter values to be applied in response to network conditions, in accordance with various aspects and embodiments of the subject disclosure. FIG. 6 includes a time axis with example times T1, T2, T3, T4, T5, and T6 separated by time intervals such as time interval 605. At time T1, an area optimizer, e.g., area optimizer 201, can determine a collective throughput CT1 of a target area. The area optimizer 201 can adjust the example parameter from a first parameter value P1 to a second parameter value P2. At time T2, area optimizer 201 can determine a collective throughput CT2 of the target area. Because CT2 is greater than CT1, the area optimizer 201 can further adjust the example parameter to a third parameter value P3. At time T3, area optimizer 201 can determine a collective throughput CT3 of the target area. Because CT3 is greater than CT2, the area optimizer 201 can further adjust the example parameter to a fourth parameter value P4. At time T4, area optimizer 201 can determine a collective throughput CT4 of the target area. Because CT4 is greater than CT3, the area optimizer 201 can further adjust the example parameter to a fifth parameter value P5. At time T5, area optimizer 201 can determine a collective throughput CT5 of the target area. Because CT5 is less than CT4, i.e., there was a decrease in the collective throughput, the area optimizer 201 can determine that P4 was the parameter value that yields maximum throughput increase in the target area, under the network conditions in which the parameter adjustments were made.

In some parameter adjustments according to FIG. 6, groups of parameters can be adjusted, and the groups can optionally include different parameter adjustments for different network nodes in the target area. For example, the values P1, P2, P3 etc. can each represent multiple parameter values for multiple network nodes. Furthermore, parameter adjustment according to FIG. 6 can be repeated multiple times with different parameters or groups of parameters, in order to determine a set of parameters to store for later application in response to similar observed network conditions. The set of parameters can be stored, e.g., in a parameter data store 340 as described in connection with FIG. 3A and FIG. 3B. Once stored, a set of parameters need not remain static but can be continually improved, e.g. by following a proactive process such as described with reference to FIG. 3A with a reactive process such as described with reference to FIG. 3B.

In some embodiments, approaches to throughput optimization according to this disclosure can generally divert load to a serving cell's less loaded neighbor cells when the serving cell is more loaded, and conversely, take some load from a serving cell's more loaded neighbor cells when the serving cell is less loaded. A basic approach can include: collect baseline traffic loads of target area; explore possible parameter adjustments using reactive parameter changes; apply an offline training model with data collected; and execute the model with proactive responses for known patterns, or reactive responses for unknown/unexpected patterns or irregularly/randomly to determine whether better parameter values are available.

Example machine learning models according to this disclosure can generally collect a load L, an average UE throughput T, and a signal distribution D, where:

$$L=[CCE\_util, num\_of\_RRC\_sessions, PRB\_util]$$

Example machine learning models can furthermore extract regressions as:

$$T=f(L,D) \text{ and } L=g(actions)$$

Example machine learning models can furthermore extract an argmax_of_T h(actions|L, D), where actions can include changing values of a set of pair-wise (e.g., cell-to-cell) and singular (e.g., cell, sector) parameters.

In an example reactive heuristic process, goals can include collecting data, such as network condition data and corresponding actions, and creating a ruleset. An example process is set forth below:
For each measurement epoch (e.g., 60 sec or less)
Get KPIs for the last measurement interval (i.e., T, D and L)
  For each serving cell $C_i$
  For each neighbor cell $C_j$
    If reach to the control epoch (e.g., 900 sec or less)
      If $T_i+T_j$ improved & any action made to $C_i$ and $C_j$
        Record prior and current T and actions made
      If $T_i<T_j$ & $L_i>L_j$
        Adjust actions as increase or decrease of parameter values
        Update with T, L, D and new parameter values
      If any action made & $T_i>T_j$ & $L_i<L_j$
        Reset parameters to default values
    If any action or reset made, Trigger actions or reset to RAN In a process such as illustrated above, the condition $T_i<T_j$ & $L_i>L_j$ can imply that the serving cell is more loaded than the neighbor cell in terms of average throughputs $T_i$, $T_j$ and loads $L_i$, $L_j$ since the last control epoch, while $T_i>T_j$ & $L_i<L_j$ can imply the neighbor cell is more loaded than the serving cell in terms of average throughputs $T_i$, $T_j$ and loads $L_i$, $L_j$ since the last control epoch. Adjust actions as increase or decrease of parameter values can be done incrementally, as discussed herein. If a prior action causes a problem such as too many handovers and/or retainability/accessibility drops, the area optimizer can optionally reset parameters to default values.

Figure 7:
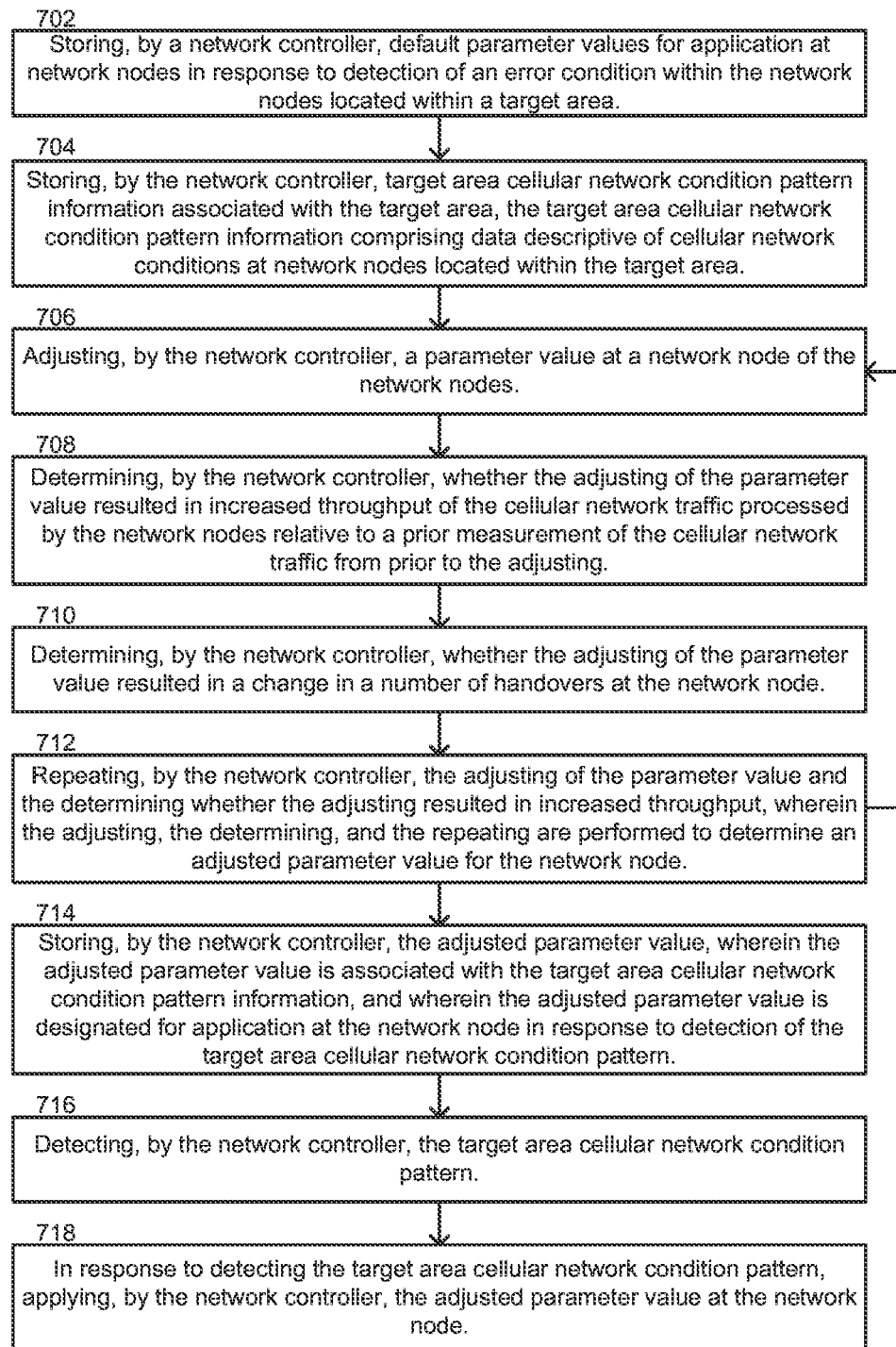
FIG. 7 is a flow diagram representing example operations of a network controller comprising an area optimizer, in accordance with various aspects and embodiments of the subject disclosure.

FIG. 7 is a flow diagram representing example operations of a network controller comprising an area optimizer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a network controller 200 comprising an area optimizer 201 such as illustrated in FIG. 2. Example operation 702 comprises storing, by the network controller 200, default parameter values for application at network nodes 211-214 in response to detection of error conditions (e.g., unexpected drops of throughput, retainability, or accessibility, and/or too many handovers between cells) within the network nodes 211-214 located within the target area 210. Operation 702 can be performed so that default parameter values are available for application to the network nodes 211-214 if needed.

Operation 704 comprises storing, by a network controller 200, target area cellular network condition pattern information, e.g., network conditions 221, associated with the target area 210, the target area cellular network condition pattern information comprising data descriptive of cellular network conditions at network nodes 211-214 located within the target area 210.

In some embodiments, a machine learning model can be used to detect the target area cellular network condition pattern. The target area cellular network condition pattern information can comprise, for each of the network nodes 211-214 located within the target area 210, at least one of: a physical resource block utilization measurement, a control channel element utilization measurement, a number of concurrent radio resource control sessions, or an average user equipment throughput, first information representative of a reference signal receive power distribution, and/or second information representative of a reference signal receive quality distribution.

Operation 706 comprises adjusting, by the network controller 200, a parameter value at a network node, e.g., network node 211, of the network nodes 211-214. The network controller 200 can use parameter values 222 to adjust the parameter value. The parameter value can comprise, e.g., a value for at least one of: an idle mode load balancing parameter, a connected mode load balancing parameter, a dual connection parameter, a mobility coverage parameter, and/or a carrier aggregation parameter.

Operation 708 comprises determining, by the network controller 200, whether the adjusting of the parameter value (pursuant to operation 706) resulted in increased throughput (without decreasing connection retainability or accessibility) of the cellular network traffic processed by the network nodes 211-214 relative to a prior measurement of the cellular network traffic from prior to the adjusting. Operation 710 comprises determining, by the network controller 200, whether the adjusting of the parameter value (pursuant to operation 706) resulted in a change in a number of handovers at the network node 211.

Operation 712 comprises repeating, by the network controller 200, the adjusting of the parameter value (pursuant to operation 706) and the determining whether the adjusting resulted in increased throughput (pursuant to operation 708). The determination regarding a change in a number of handovers can also be repeated at 712. The adjusting 706, the determining 708 and 710, and the repeating 712 can be performed to determine an adjusted parameter value for the network node 211. The adjusted parameter value can be one that increases throughput of the target area 210 without negatively impacting the number of handovers, retainability, and accessibility.

In some embodiments, in order to determine the adjusted parameter value for the network node 211, the adjusting the parameter value (pursuant to operation 706) can be incrementally repeated until an incremental adjustment is determined to have resulted in decreased throughput relative to a prior throughput of the cellular network traffic from prior to the incremental adjustment, e.g., as can be understood by reference to FIG. 6.

Operation 714 comprises storing, by the network controller 200, the adjusted parameter value, wherein the adjusted parameter value is associated with the target area cellular network condition pattern information, e.g., network conditions 221, and wherein the adjusted parameter value is designated for application at the network node 211 in response to detection of the target area cellular network condition pattern (network conditions 221).

Operations 716 and 718 can be performed subsequent to operation 714, to make use of the parameter value learned through application of operations 704-714. Operation 716 comprises detecting, by the network controller 200, the target area cellular network condition pattern (network conditions 221). Operation 718 comprises, in response to detecting the target area cellular network condition pattern (network conditions 221), applying, by the network controller 200, the adjusted parameter value at the network node 211.

Figure 8:
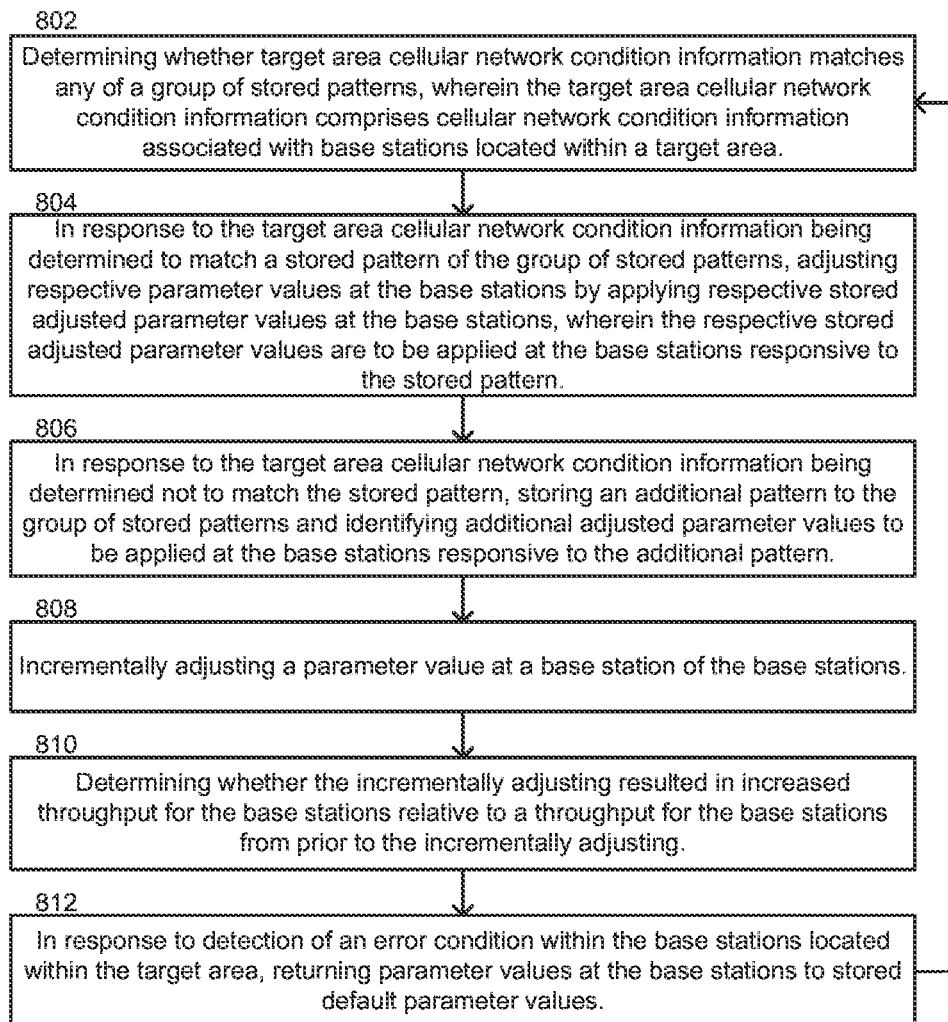
FIG. 8 is a flow diagram representing further example operations of a network controller comprising an area optimizer, in accordance with various aspects and embodiments of the subject disclosure.

FIG. 8 is a flow diagram representing further example operations of a network controller comprising an area optimizer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a network controller comprising an area optimizer 301 such as illustrated in FIGS. 3A and 3B. Example operation 802 comprises determining, e.g., by condition analyzer 310, whether target area cellular network condition information, such as 305 or 307 matches any of a group of stored patterns 321, 322, wherein the target area cellular network condition information 305 comprises cellular network condition information associated with base stations located within a target area 300. The target area cellular network condition pattern information can comprise any of the network condition data described herein.

Operation 804 comprises a proactive response such as illustrated in FIG. 3A. Operation 804 comprises, in response to the target area cellular network condition information 305 being determined to match a stored pattern, e.g., pattern 322 of the group of stored patterns 321, 322, adjusting respective parameter values at the base stations by applying respective stored adjusted parameter values, e.g., set 342, at the base stations, wherein the respective stored adjusted parameter values 342 are to be applied at the base stations responsive to the stored pattern 322. The base station parameters that are adjusted pursuant to operation 804 can include any of the parameters described herein.

Operation 806 comprises a reactive response such as illustrated in FIG. 3B. Operation 806 comprises, in response to the target area cellular network condition information 307 being determined not to match the stored pattern 321, 322, storing an additional pattern 323 to the group of stored patterns 321, 322 and identifying, e.g., by parameter learning 335, additional adjusted parameter values, such as set 343, to be applied at the base stations responsive to the additional pattern 323.

Operations 808 and 810 can be performed in connection with identifying the additional adjusted parameter values 343. Operation 808 comprises incrementally adjusting a parameter value at a base station of the base stations, e.g., using adjusted parameter values 354. Operation 810 comprises determining, e.g., using network conditions 352, whether the incrementally adjusting (pursuant to operation 808) resulted in increased throughput for the base stations relative to a throughput for the base stations from prior to the incrementally adjusting. Operations 808 and 810 can optionally be repeated until an incremental adjustment is determined to have resulted in decreased throughput relative to a prior throughput of the cellular network traffic from prior to the incremental adjustment.

In some embodiments, identifying the additional adjusted parameter values can further comprise determining whether the incrementally adjusting the parameter value (pursuant to operation 808) resulted in a change in an accessibility measurement, number of handovers, or change in retainability at a base station of the base stations.

Operation 812 comprises, in response to detection of an error condition within the base stations located within the target area 300, returning parameter values at the base stations to stored default parameter values.

As indicated by the return arrow from operation 812 to operation 802, the target area cellular network condition information 305 or 307 can comprise information associated with a time interval, and the operations 802-812 can be repeated periodically according to the time interval, e.g., by repeating the determining whether subsequently received target area cellular network condition information 305 or 307 matches any of the group of stored patterns 321, 322, or 333.

Figure 9:
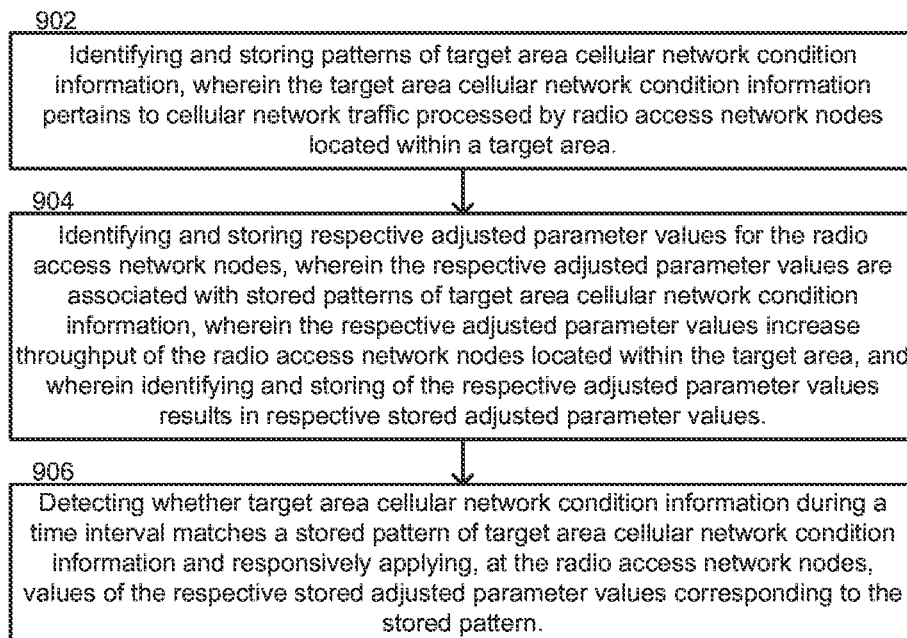
FIG. 9 is a flow diagram representing further example operations of a network controller comprising an area optimizer, in accordance with various aspects and embodiments of the subject disclosure.

FIG. 9 is a flow diagram representing further example operations of a network controller comprising an area optimizer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a network controller comprising an area optimizer 301 such as illustrated in FIGS. 3A and 3B. Example operation 902 comprises identifying and storing patterns of target area cellular network condition information, e.g., patterns 321, 322, and 333, wherein the target area cellular network condition information pertains to cellular network traffic processed by radio access network nodes located within a target area 300.

Operation 904 comprises identifying and storing respective adjusted parameter values, e.g., sets 341, 342, and 343 for the radio access network nodes, wherein the respective adjusted parameter values 341, 342, and 343 are associated with stored patterns 321, 322, and 333 of target area cellular network condition information, wherein the respective adjusted parameter values 341, 342, and 343 increase throughput of the radio access network nodes located within the target area 300, and wherein identifying and storing of the respective adjusted parameter values 341, 342, and 343 results in respective stored adjusted parameter values 341, 342, and 343. Operation 904 can optionally further comprise determining whether the adjusted parameter values 341, 342, and 343 result in a change in a retainability measurement, an accessibility measurement, and/or a number of handovers at the radio access network nodes. If retainability, accessibility, and/or handovers are negatively affected by an adjusted parameter value then such an adjusted parameter value can omitted from adjusted parameter values 341.

In an embodiment, identifying and storing the adjusted parameter values can comprise incrementally adjusting a parameter value at a radio access network node, e.g., using adjusted parameter values 345, and determining whether incrementally adjusting the parameter value resulted in increased throughput of the cellular network traffic processed by the radio access network nodes relative to a prior throughput of the cellular network traffic from prior to the incrementally adjusting. The incrementally adjusting the parameter value can optionally be repeated until an incremental adjustment is determined to have resulted in decreased throughput relative to a prior throughput of the cellular network traffic from prior to the incremental adjustment.

Operation 906 comprises detecting whether target area cellular network condition information during a time interval, e.g., network conditions 305 or 307, matches a stored pattern 321, 322, or 333 of target area cellular network condition information and responsively applying, at the radio access network nodes, values of the respective stored adjusted parameter values 341, 342, or 343 corresponding to the stored pattern 321, 322, or 333. A machine learning model can be used to detect whether target area cellular network condition information during the time interval (e.g., network conditions 305 or 307) matches the stored pattern (321, 322, or 333) of target area cellular network condition information.

Figure 10:
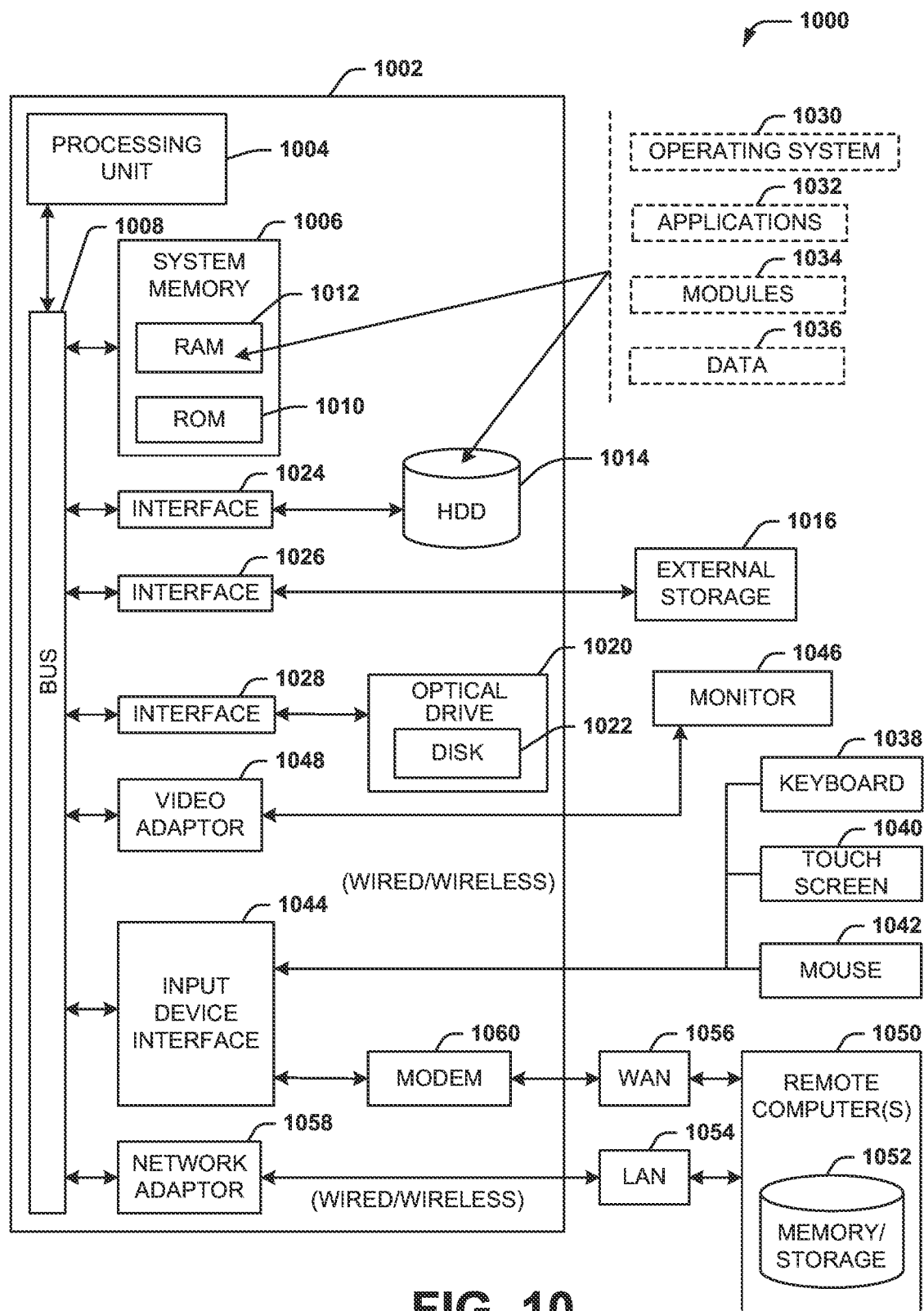
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.).

While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    identifying, by a network controller comprising a processor, respective patterns of target area cellular network condition information associated with radio access network nodes located within a target area;
    identifying, by the network controller, respective groups of parameter values for the radio access network nodes, wherein the respective groups of parameter values are associated with the respective patterns of target area cellular network condition information, and wherein the respective groups of parameter values increase throughput of the radio access network nodes without decreasing connection retainability or accessibility of the radio access network nodes;
    detecting, by the network controller, whether target area cellular network condition information matches a pattern of the respective patterns of target area cellular network condition information; and
    in response to the target area cellular network condition information matching the pattern, applying, by the network controller to the radio access network nodes, a corresponding group of parameter values of the respective groups of parameter values, wherein the corresponding group of parameter values is associated with the pattern.

2. The method of claim 1, wherein identifying the respective groups of parameter values comprises incrementally adjusting, by the network controller, a parameter value at a radio access network node, and determining, by the network controller, whether incrementally adjusting the parameter value resulted in increased throughput of cellular network traffic processed by the radio access network nodes relative to a prior measurement of the cellular network traffic from prior to the incrementally adjusting.

3. The method of claim 2, wherein identifying the respective groups of parameter values further comprises repeating the incrementally adjusting the parameter value until an incremental adjustment is determined to have resulted in decreased throughput relative to a prior measurement of the cellular network traffic from prior to the incremental adjustment.

4. The method of claim 1, wherein a machine learning model is used to detect whether target area cellular network condition information matches the pattern.

5. The method of claim 1, further comprising storing default parameter value for application at the radio access network nodes in response to detection of an error condition within the radio access network nodes located within the target area.

6. Network controller equipment, comprising:
a processor; and
a memory that stores executable instructions that, when executed by the processor, facilitate performance of operations, comprising:
storing target area cellular network condition pattern information, the target area cellular network condition pattern information comprising data descriptive of cellular network conditions at network nodes located within a target area;
adjusting a parameter value at a network node of the network nodes;
determining whether the adjusting of the parameter value resulted in increased throughput without decrease of connection retainability of cellular network traffic processed by the network nodes;
repeating the adjusting of the parameter value and the determining whether the adjusting resulted in increased throughput without decrease of connection retainability, in order to determine an adjusted parameter value for the network node; and
storing the adjusted parameter value, wherein the adjusted parameter value is associated with the target area cellular network condition pattern information, and wherein the adjusted parameter value is designated for application at the network node in response to detection of the target area cellular network condition pattern.

7. The network controller equipment of claim 6, wherein the operations further comprise:
detecting the target area cellular network condition pattern; and
in response to detecting the target area cellular network condition pattern, applying the adjusted parameter value at the network node.

8. The network controller equipment of claim 6, wherein a machine learning model is used to determine the adjusted parameter value for the network node.

9. The network controller equipment of claim 6, wherein the operations further comprise determining whether the adjusting of the parameter value resulted in a change in a number of handovers at the network node.

10. The network controller equipment of claim 6, wherein the operations further comprise storing a default parameter value for application at the network node in response to detection of an error condition within the network nodes located within the target area.

11. The network controller equipment of claim 6, wherein the target area cellular network condition pattern information comprises, for the network nodes located within the target area, at least one of: a physical resource block utilization measurement, a control channel element utilization measurement, a number of concurrent radio resource control sessions, or an average user equipment throughput.

12. The network controller equipment of claim 6, wherein the parameter value comprises a value for at least one of: an idle mode load balancing parameter or a connected mode load balancing parameter.

13. The network controller equipment of claim 6, wherein, in order to determine the adjusted parameter value for the network node, the adjusting the parameter value is incrementally repeated until an incremental adjustment is determined to have resulted in decreased throughput or decrease of connection retainability.

14. A non-transitory machine-readable medium, comprising executable instructions that, when executed by a processor, facilitate performance of operations, comprising:
determining whether target area cellular network condition information matches a pattern of a group of stored patterns, wherein the target area cellular network condition information comprises cellular network condition information associated with base stations located within a target area,
wherein, in response to the target area cellular network condition information being determined to match the pattern parameter values are adjusted at the base stations by application of respective adjusted parameter values at respective base stations of the base stations; and
in response to the target area cellular network condition information being determined not to match the pattern, storing an additional pattern to the group of stored patterns and identifying additional adjusted parameter values to be applied at the base stations responsive to the additional pattern, wherein identifying the additional adjusted parameter values comprises:
incrementally adjusting a parameter value at a base station of the base stations; and
determining whether the incrementally adjusting the parameter value at the base station resulted in increased throughput of the base stations without decrease of connection accessibility.

15. The non-transitory machine-readable medium of claim 14, wherein the target area cellular network condition information comprises information associated with a time interval, and wherein the operations further comprise periodically determining, according to the time interval, whether the target area cellular network condition information matches any of the group of stored patterns.

16. The non-transitory machine-readable medium of claim 14, wherein identifying the additional adjusted parameter values further comprises determining whether the incrementally adjusting the parameter value at the base stations resulted in a decrease of connection retainability.

17. The non-transitory machine-readable medium of claim 14, wherein identifying the additional adjusted parameter values further comprises repeating the incrementally adjusting of the parameter value until an incremental adjustment is determined to have resulted in decreased throughput of the base stations.

18. The non-transitory machine-readable medium of claim 14, wherein the operations further comprise, in response to detection of an error condition within the base stations, returning parameter values at the base stations to stored default parameter values.

19. The non-transitory machine-readable medium of claim 14, wherein the target area cellular network condition pattern information comprises, for the base stations located within the target area, at least one of: first information representative of a reference signal receive power distribution or second information representative of a reference signal receive quality distribution.

20. The non-transitory machine-readable medium of claim 14, wherein the parameter value comprises a value for a parameter comprising a dual connection parameter, a mobility coverage parameter, or a carrier aggregation parameter.

* * * * *